United States Patent
Yamamoto (12) 
(10) Patent No.: US 11,351,474 B2
(45) Date of Patent: Jun. 7, 2022

(54) CLEANING AND FLUID DISTILLATION APPARATUS

(71) Applicant: Uni-ram Corporation, Ontario (CA)

(72) Inventor: Soichiro Yamamoto, Ontario (CA)

(73) Assignee: UNI-RAM CORPORATION, Ontario (CA)

( * ) Notice: Subject to any disclaimer, the term of this patent is extended or adjusted under 35 U.S.C. 154(b) by 75 days.

(21) Appl. No.: 16/366,743

(22) Filed: Mar. 27, 2019

(65) Prior Publication Data

US 2020/0306661 A1 Oct. 1, 2020

(51) Int. Cl.
*B01D 3/10* (2006.01)
*B08B 3/10* (2006.01)
*B01D 3/14* (2006.01)

(52) U.S. Cl.
CPC ............. *B01D 3/101* (2013.01); *B01D 3/106* (2013.01); *B01D 3/14* (2013.01); *B08B 3/10* (2013.01); *B01D 2201/56* (2013.01)

(58) Field of Classification Search
CPC .. B08B 3/10; B08B 3/14; B08B 3/006; B08B 3/106
See application file for complete search history.

(56) References Cited

U.S. PATENT DOCUMENTS

| | | | |
|---|---|---|---|
| 4,025,363 A * | 5/1977 | De Santis | B05B 14/00 134/102.2 |
| 4,443,269 A * | 4/1984 | Capella | B08B 3/006 134/12 |
| 5,213,117 A * | 5/1993 | Yamamoto | B08B 3/006 134/58 R |
| 5,349,974 A | 9/1994 | Mansur | |
| 5,534,159 A | 7/1996 | Krieger | |
| 5,549,128 A | 8/1996 | Mansur | |
| 5,579,704 A | 12/1996 | Mansur | |
| 5,669,401 A | 9/1997 | Mansur | |
| 5,755,973 A | 5/1998 | Krieger | |
| 5,769,912 A | 6/1998 | Mansur | |
| 5,827,374 A | 10/1998 | Mansur | |
| 5,876,567 A | 3/1999 | Yamamoto et al. | |
| 6,044,854 A * | 4/2000 | Marks | C12R 2001/00 134/111 |
| 6,279,587 B1 * | 8/2001 | Yamamoto | B08B 3/006 134/104.2 |
| 7,531,065 B2 * | 5/2009 | Yamamoto | B01D 1/0017 202/160 |
| 7,533,678 B2 * | 5/2009 | Rosa | B05B 15/555 134/111 |
| 8,470,136 B2 * | 6/2013 | Publ | B08B 3/006 202/160 |

(Continued)

*Primary Examiner* — Jonathan Luke Pilcher
(74) *Attorney, Agent, or Firm* — David D. Brush; Westman, Champlin & Koehler, P.A.

(57) ABSTRACT

A cleaning and distillation apparatus with a clean fluid tank, a cleaning tank, a recirculating fluid tank located below the cleaning tank, a removable separator panel partitioning the clean fluid tank from the recirculating fluid tank, a distillator and an outlet for dispensing fluid is provided. Also provided is a cleaning apparatus, without the distillator, the cleaning apparatus having a cleaning tank, a recirculating fluid tank located below the cleaning tank, a removable separator panel partitioning the recirculating fluid tank from the cleaning tank, and a fluid dispenser.

19 Claims, 9 Drawing Sheets

(56) References Cited

U.S. PATENT DOCUMENTS

2005/0011742 A1* 1/2005 Yamamoto ............... B08B 3/02
  203/1
2014/0137904 A1* 5/2014 Suarez .................... B08B 3/006
  134/109

* cited by examiner

CLEANING AND FLUID DISTILLATION APPARATUS

TECHNICAL FIELD

Cleaning apparatus and fluid distillation apparatus.

BACKGROUND

There exist a variety of apparatus for automatically or manually cleaning objects through the use of cleaning fluid. During machine parts manufacturing, as well as during maintenance, repair and re-furbishing operations, various parts and objects need to be cleaned, either manually or through an automatic cleaning apparatus. Cleaning fluids used in the apparatus becomes contaminated with grease, oil, glue, soil, dirt, metal chips and other contaminants after the cleaning operations. Under normal circumstances, waste management companies are hired to remove the contaminated cleaning fluid, and to supply new cleaning fluid.

SUMMARY

There is a need for a combination of a cleaning apparatus with a distillator such that the contaminated cleaning fluid is transferred to a distillator which distills the fluid by removing contaminants and then recirculated back into the system for re-use. The contaminants which are extracted through this process occupy a lower volume compared to undistilled, contaminated cleaning fluid. The extracted contaminants can then be taken away by waste management companies for disposal while the distilled cleaning fluid is re-used for cleaning. Considering that contaminated cleaning fluid is generally classified as hazardous material, such a process has both economic and environmental benefits by greatly reducing the risk of exposure to the hazardous materials during handling and transportation. What is further desired is a combination device in which easy access is provided to both the internal cleaning and distillation components of the system, in which the components may be easily repaired or replaced.

A cleaning and distillation apparatus is provided. The apparatus has a clean fluid tank with a first inlet for receiving cleaning fluid, a second inlet for receiving distilled cleaning fluid and at least one outlet for dispensing fluid. There is also a cleaning tank for receiving objects to be cleaned and a bottom portion, with a recirculating fluid tank mounted below the cleaning tank. The recirculating fluid tank has an upper portion in fluid communication with the bottom portion of the cleaning tank, and at least one outlet for dispensing recirculating fluid which has become contaminated.

Also provided as part of the apparatus is a removable separator panel for supporting the objects to be cleaned, which is mountable in an area between the bottom portion of the cleaning tank and the upper portion of the recirculating fluid tank and has an outlet to release fluid from the cleaning tank into the recirculating fluid tank. Also provided as part of the apparatus is a distillator for distilling contaminated fluid; the distillator has a distillation tank with an inlet for receiving contaminated fluid from the outlet of the recirculating fluid tank, a heater for heating contaminated fluid into vapor and a vapor outlet, a first outlet for dispensing contaminants remaining from vaporization, a condenser in fluid communication with the vapor outlet for converting vapor into distilled cleaning fluid and a second outlet for dispensing distilled cleaning fluid into the second inlet of the clean fluid tank. The apparatus also includes a fluid dispenser for dispensing fluid from at least one of the clean fluid tank and recirculating fluid tank and a controller for selectively actuating at least one of the distillator and fluid dispenser.

The apparatus may also include secondary features such as a compressed air dispenser, a selectively openable valve to allow choice of dispensing between compressed air, clean fluid and fluid from the recirculating fluid tank, a switch to actuate the valve, a handle for handling the tank separator panel, and various sensors means to monitor the operation of the apparatus. The apparatus may also include a manual cleaning tool such as a flow-through brush and a valve for controlling fluid flow from the flow-through brush.

In an embodiment, the cleaning apparatus, comprises, a cleaning tank, a recirculating fluid tank located below the cleaning tank, a removable separator panel for separating the recirculating fluid tank from the cleaning tank, and a fluid dispenser.

In another aspect, in an embodiment of a cleaning apparatus, without the distillator, the cleaning apparatus comprises a cleaning tank, a recirculating fluid tank located below the cleaning tank, a removable separator panel for separating the recirculating fluid tank from the cleaning tank, and a fluid dispenser.

DESCRIPTION OF THE DRAWINGS

Embodiments will now be described with reference to the figures, in which like reference characters denote like elements, by way of example, and in which.

DETAILED DESCRIPTION

Figure 1:
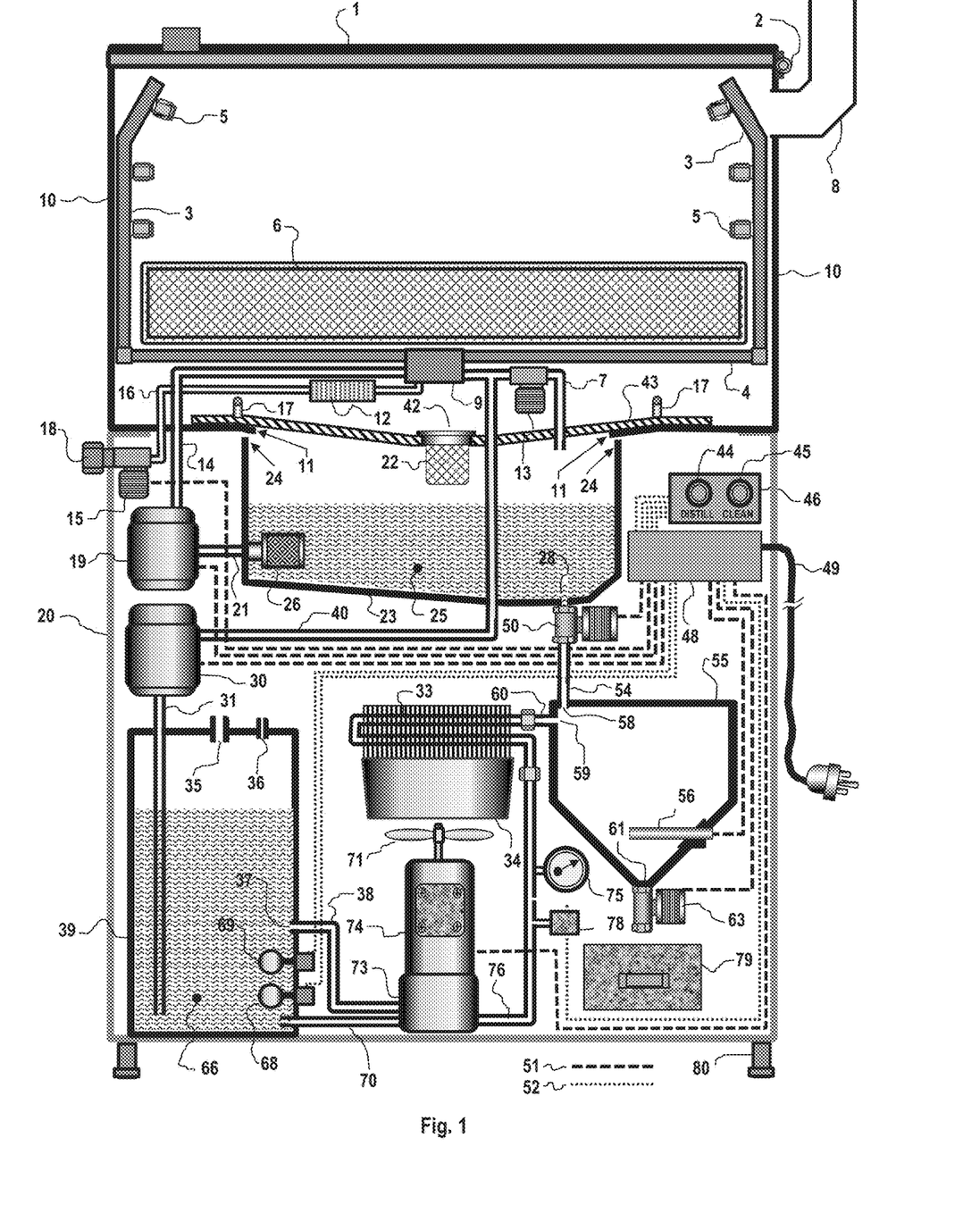
FIG. 1 is a schematic view of an automatic cleaning and distillation apparatus according to one embodiment.
Figure 2:
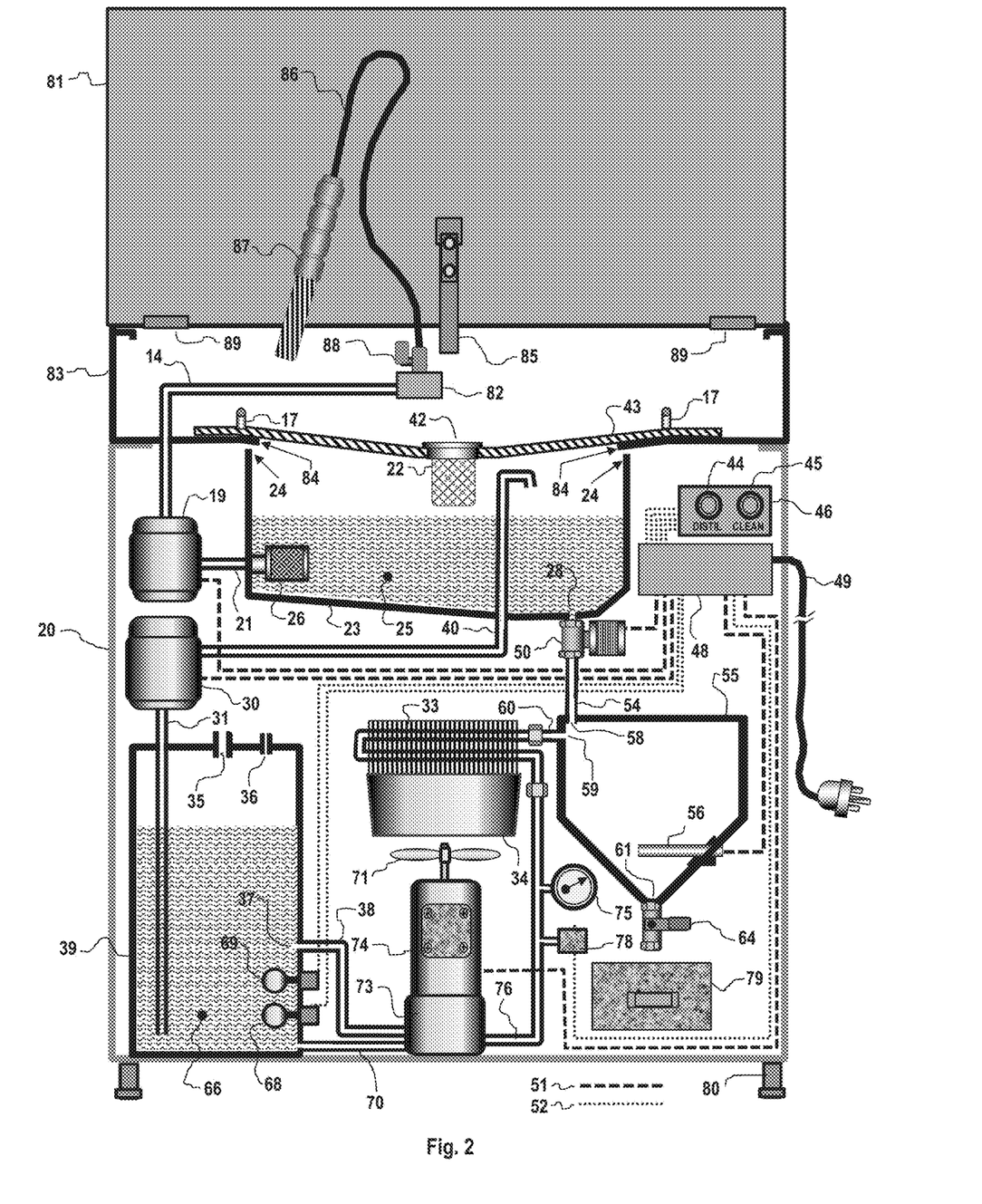
FIG. 2 is a schematic view of a manual cleaning and distillation apparatus with a cleaning tool, according to another embodiment.

An apparatus which dispenses a cleaning fluid for cleaning objects and distills the contaminated fluid for re-use is provided. Shown in FIG. 1 is an example of one specific embodiment wherein a distillation apparatus is combined with at least one nozzle dispenser for automatic, hands-free cleaning. In FIG. 2, there is provided an example of another specific embodiment wherein a distillation apparatus is combined with a manual cleaning tool such as a brush.

As shown in FIG. 1, cleaning tank 10 is supported by a base cabinet 20. Within the base cabinet 20 is a clean fluid tank 39 which is used to store clean fluid 66 used during the cleaning process. There may be a cleaning tank lid 1 which is attached to the cleaning tank 10 by means of hinges 2 such that the lid 1 may be opened and closed.

In this specific embodiment, provided as part of or in close proximity to the cleaning tank 10 is a fluid dispenser system for cleaning, rinsing, and/or drying objects. The structure of the fluid dispenser may include distribution posts 3 which are used to support a series of spray jets 5 and distribution pipes 4 which distribute recirculating fluid 25, clean fluid 66 and compressed air to the spray jets 5. Within the cleaning tank 10 there is optionally also a removable screen basket 6 which may be used to accommodate the objects to be cleaned. A ventilation pipe 8 may also be provided as an outlet for excess pressure and fluid fume.

Mounted below the cleaning tank 10 is a recirculating fluid tank 23 which collects cleaning fluid that has become contaminated as a result of the cleaning process. The recirculating fluid 25 stored in recirculating fluid tank 23 may be drained for distillation, or re-used for another cleaning cycle until it becomes too contaminated and distillation is required. The cleaning tank 10 has a bottom opening 11 located above the top opening 24 of the recirculating fluid tank 23. In this embodiment, cleaning tank 10 and recirculating fluid tank 23 are separate compartments. However, the two tanks may be manufactured as one unit, with bottom opening 11 of cleaning tank 10 being integral with top opening 24 of recirculating fluid tank 23. This arrangement of the cleaning tank 10 above the recirculating fluid tank 23 allows for the installation of a removable tank separator panel 43 to separate or partition the two tanks. With respect to mounting, removable tank separator panel 43 may have a larger surface area than the bottom opening of the cleaning tank 10, thus allowing it to rest directly on top of the bottom opening of the cleaning tank 10. The removable tank separator panel 43 may be mounted in other ways (e.g., by way of attachment to the sidewalls of either the cleaning tank 10 or recirculating fluid tank 23) as long as a removable partition is created in the area along the lower portion of the cleaning tank 10 and the upper portion of recirculating fluid tank 23. Removable tank separator panel 43 has an outlet 42 to allow fluid to flow from the cleaning tank 10 into the recirculating fluid tank 23. The position of outlet 42 may be anywhere along the surface of tank separator panel 43, and there may be multiple outlets to allow fluid to pass through the tank separator panel 43. When assembled, tank separator panel 43 acts as a bottom sink surface. Outlet 42 of the tank separator panel 43 may optionally be fitted with a removable strainer 22 to prevent large debris from entering recirculating fluid tank 23. At least one handle 17 may be attached to tank separator panel 43 to facilitate removal and replacement of tank separator panel 43.

When the tank separator panel 43 is removed, it provides easy access to the inside of recirculating fluid tank 23 for maintenance and service work, or to manually extract contaminated cleaning fluid. For example, removal of tank separator panel 43 may allow access to a recirculating fluid tank drain port 28 which may be clogged, or access to recirculating fluid filter 26 which needs to be cleaned or replaced over time. Without a tank separator panel 43, the entire cleaning tank and/or the dispenser system may need to be disassembled to access these areas of the recirculating fluid tank for maintenance.

Furthermore, the cleaning surface of the cleaning apparatus is typically the surface that suffers the most wear and damage over time due to the placement of heavy objects to be cleaned thereon. Acting as a cleaning surface, while the tank separator panel 43 may become scratched or otherwise damaged over time during the cleaning process, its removability facilitates easy replacement when this occurs. Without a removable tank separator panel 43, when the cleaning surface becomes damaged, the entire cleaning tank may need to be replaced, resulting in considerable costs or having to replace the apparatus in its entirety.

Furthermore, the tank separator panel 43 also allows the bottom cleaning surface to have a different material, thickness, protective finish, design or construction. As indicated above, the bottom cleaning surface is typically the surface which suffers the most wear and tear. Accordingly, it would be beneficial for at least this portion of the apparatus to have increased durability, whereas the same increased durability may not be required for the side walls of the cleaning tank 10. It may be unnecessary and costly to construct an entire cleaning tank 10 out of high quality or high strength material or design, when the premium material is only required for the cleaning surface. Given a limited budget, the side walls of cleaning tank 10 itself may be constructed of a relatively more cost-effective material, with a tank separator panel 43 of a more sophisticated design or higher quality material.

Figure 6A:
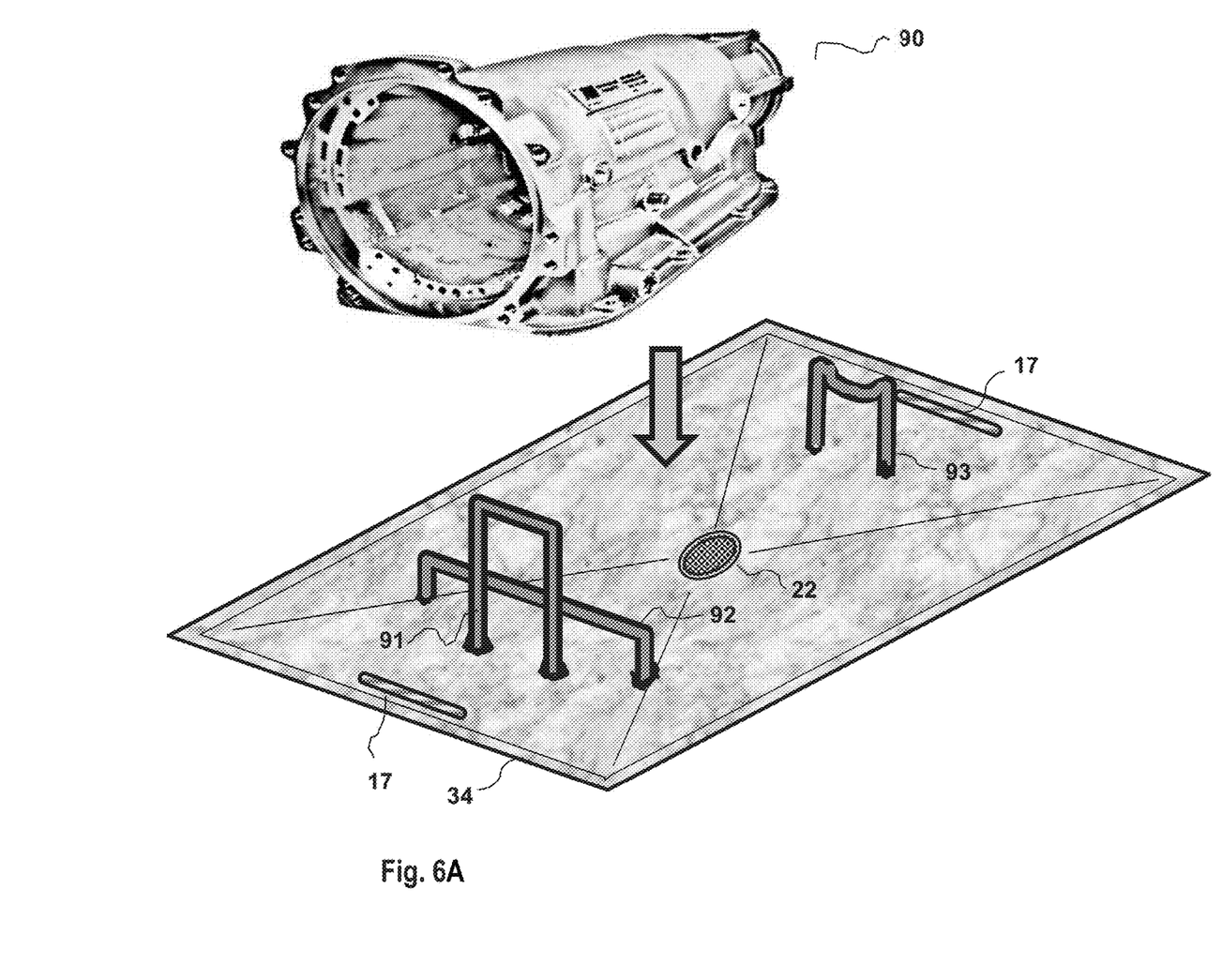
FIG. 6A is a perspective view of a tank separator panel having projections extending from its surface for supporting an object to be cleaned.
Figure 6B:
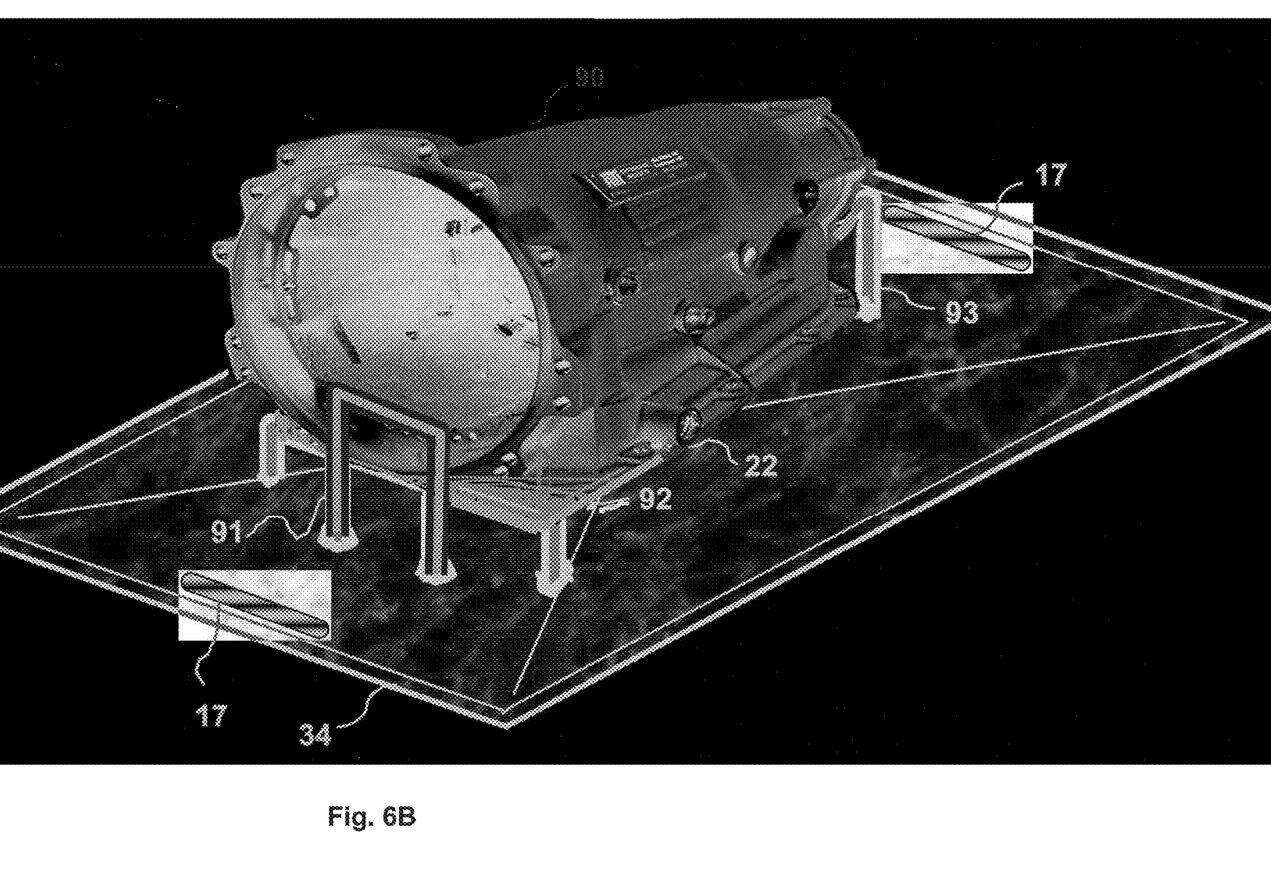
FIG. 6B is a perspective view of the tank separator panel of FIG. 6A, supporting the object to be cleaned.

Furthermore, as shown in FIG. 6A, the tank separator panel 43 may be custom designed to support specific objects to be cleaned, with a plurality of projections such as a front stopper 91, front support 92 and rear support 93 that may be used to accommodate the shape of the object to be cleaned such as a transmission housing 90. FIG. 6B shows the transmission housing 90 as mounted on the tank separator panel 43 and supported and kept in place by the various projections. As the tank separator panel 43 is removable, this allows for a plurality of different supporting surfaces to be quickly changed to accommodate different objects by simply replacing the tank separator panels. The tank separator panel 43 may also be designed to have varying degrees of incline to accommodate different object sizes or desired fluid flow rate.

In addition to the top opening 24, recirculating fluid tank 23 also has an outlet, i.e., drain port 28 which allows contaminated recirculating fluid 25 to flow into a distillator system to be distilled. Within the distillator, once contaminated fluid has been received into distillation tank 55 through inlet port 58, the contaminated fluid may be distilled by directly heating the fluid through an immersion heater 56. Although an immersion heater 56 is provided in the specific embodiments, other heat sources such as an externally mounted heater or indirect heating by means of thermal oil may also be used. The heater may be installed closer to the bottom of the tank such that even relatively small volume of contaminated fluid may be heated for distillation. Any contaminants remaining in the distillation tank 55 after completion of heating process may be drained by opening drain valve 63 into contaminant container 79 for removal. Drain valve 63 may be of the automatic type as shown in FIG. 1 or the manual type as shown in FIG. 2.

During the distillation process, vaporized fluid is extracted through vapor outlet port 59, and then cooled and condensed by a cooling system which may include a combination of radiator 33 and cooling fan 71. The distilled cleaning fluid is received into the clean fluid tank 39 where both clean fluid and distilled fluid are stored for dispensing during cleaning or replenishing the recirculating fluid tank 23.

In the specific embodiment shown in FIG. 1, there are various means for transporting and controlling flow of fluid within the system. For example, a switching valve 9 may be used to selectively direct any one of clean fluid 66, recirculating fluid 25, or compressed air into the distribution posts 3 for dispensing through spray jets 5. The operation of switching valve 9 may be automated and controlled through a controller 46, which may include a computer with a central processing unit or a programmable controller.

Where an external source of compressed air (e.g., for cleaning or drying) is desired in addition to clean fluid 66 or recirculating fluid 25, a compressed air dispenser may be included. The air dispenser may include an air inlet fitting 18 attached to base cabinet 20, and an air control solenoid valve 15 directly connected to air inlet fitting 18. One end of air supply tube 16 may connected to the output port of air control solenoid valve 15 and another end may be connected to air inlet port of switching valve 9. Additionally, an air heater 12 may be used to provide compressed air of a desired pre-set temperature to be supplied to all spray jets 5 by way of distribution posts 3 while the air control solenoid valve 15 is kept open for a desired period of time.

The recirculating fluid 25 held in recirculating fluid tank 23 may be supplied through an optional recirculating fluid filter 26 within the recirculating fluid tank 23 and through the recirculating fluid suction pipe 21 to a recirculating fluid pump 19 and dispensed through recirculating fluid supply tube 14 for distribution through switching valve 9 into distribution posts 3 and spray jets 5.

When the recirculating fluid 25 is too contaminated to be used for cleaning operation, the contaminated fluid within recirculating fluid tank 23 may be drained into the distillation tank 55 to be distilled through the distillation process described above. To control and facilitate this draining process a drain control solenoid valve 50 may be installed to the drain port 28 of recirculating fluid tank 23. One end of drain passage pipe 54 may be connected to drain control solenoid valve 50 and another end may be connected to the inlet port 58 of the distillation tank 55. Drain control solenoid valve 50 may be actuated for a desired pre-set length of time to perform draining of recirculating fluid tank 23.

For dispensing of clean fluid, clean fluid 66 inside clean fluid tank 39 may be pumped through clean fluid suction pipe 31 and clean fluid pump 30, and supplied through clean fluid supply tube 40 to the switching valve 9. Clean fluid 66 may also be fed into the recirculating fluid tank 23 during the replenishing process. While the switching valve 9 is closed and the filler solenoid valve 13 is opened, clean fluid pump 30 fills recirculating fluid tank 23 with a pre-set volume of clean fluid 66 from filler tube 7. Top end of clean fluid suction pipe 31 may be connected to the suction port of clean fluid pump 30. The lower opening of the clean fluid suction tube 31 may be submerged in clean fluid 66 and may be positioned close to the bottom of clean fluid tank 39. A filling port 35 and a breather port 36 may be provided on the clean fluid tank 39 for the convenience of filling clean fluid tank 39 with clean fluid 66.

The clean fluid tank 39 also has a secondary inlet for receiving distilled cleaning fluid. This secondary inlet may be connected to a discharge line 38 which supplies distilled cleaning fluid into the clean fluid tank 39 from vacuum pump 73 which is directly engaged by an AC motor 74, and which may also drive cooling fan 71

Various monitoring means may be provided within the system to monitor temperature, pressure, as well as fluid levels and to send signals to controller 46. Clean fluid tank 39 may be equipped with a water level sensor 68 for monitoring level of water accidentally introduced into clean fluid tank 39 and a fluid level sensor 69 may be used to monitor the level of clean fluid 66. A fluid feed pipe 70 may be connected between the bottom of clean fluid tank 39 and liquid inlet port of vacuum pump 73 for maintaining the liquid seal ring inside the vacuum pump 73. The top end of vacuum inlet line 76 may be connected to the outlet of radiator 33 and the bottom end may be connected to the suction port of vacuum pump 73. A vacuum gage 75 and a vacuum sensor 78 may be connected to vacuum pump inlet line 76 which transports distilled cleaning fluid into the clean fluid tank 39.

Operations of the system, including both cleaning and distillation functions, are controlled by a controller 46, which may be connected to a separate distillation push button 44 to be used for starting and stopping distillation process and a cleaning push button 45 to start or stop cleaning process. Relay board 48 with power cord 49 is connected to controller 46 and actuates various parts of the system, including recirculating fluid pump 19, clean fluid pump 20, AC motor 74, drain control solenoid valve 50, and immersion heater 56, based on signals received from controller 46. A combination of high voltage wiring 51 and low voltage wiring 52 may be used to connect the various electrical components of the system. For example and as shown in FIGS. 1 and 2, high voltage wiring 51 may be used to connect air control solenoid valve 15, recirculating fluid pump 19, clean fluid pump 30, drain control solenoid valve 50, AC Motor 74, immersion heater 56, automatic distillation drain valve 63 with relay board 48. Low voltage wiring 52 may be used to connect sensors such as water level sensor 68, fluid level sensor 69, and vacuum sensor 78 with relay board 48. Low voltage wiring 52 may also be used to connect controller 46 with relay board 48.

Optionally, support legs 80 which may either be adjustable or non-adjustable may be provided at the bottom of base cabinet 20.

Another embodiment where the fluid dispenser is combined with a manual cleaning tool is shown in FIG. 2. Provided in this embodiment is a fluid dispenser which is connected to a manual cleaning tool including a flow through brush 87, a flow control valve 88, a fluid supply hose 86, and a connector block 82 connected to the recirculating fluid pump 19. The flow through brush 87 which may be used to manually clean objects, as well as dispense cleaning fluid through fluid supply hose 86 connected to the center of the brush, and a flow control valve 88 or other spigot may be provided. In this specific embodiment, cleaning fluid is drawn from recirculating fluid tank 23 through recirculating fluid pump 19. When recirculating fluid 25 is contaminated to the point of where clean fluid 66 is required, the contaminated recirculating fluid 25 in recirculating fluid tank 23 may be drained into distillation tank 55 and recirculating fluid tank 23 receives clean fluid 66 from the clean fluid tank 39 through clean fluid supply tube 40. To facilitate fluid flow from the recirculating fluid tank 23 to the fluid supply hose 86, a recirculating fluid pump 19 is used to transfer fluid from recirculating fluid filter 26 and recirculating fluid suction tube 21 to the recirculating fluid supply tube 14. Although not shown, for further convenience a foot pedal switch may also be connected to the system for controlling fluid flow from the flow through brush 87, in addition to the control provided by cleaning ON/OFF button 45.

Optionally, when cleaning tank lid 81 which is attached to cleaning tank 83 via tank lid hinges 89 and when open, the cleaning tank lid 81 may be held in the open position by lid stay 85.

Similar to the embodiment provided in FIG. 1, a distillation ON/OFF button 44 and cleaning ON/OFF button 45 may be attached to controller 46. Relay board 48 with power cord 49 is connected to controller 46 and can actuate various components of the system based on signals received from controller 46, similar to those described with respect to the embodiment of FIG. 1. However, one difference is that in FIG. 2, a manual distillation tank drain valve 64 is used on distillation tank 55 in place of the automatic distillation tank drain valve 63 as shown in FIG. 1. Accordingly, there is no connection between the manual distillation tank drain valve 64 and the relay board 48. The other components of the system are similar to or identical to those found in FIG. 1, and are connected using the same combination of low voltage wiring 52 and high voltage wiring 51.

Figure 3A:
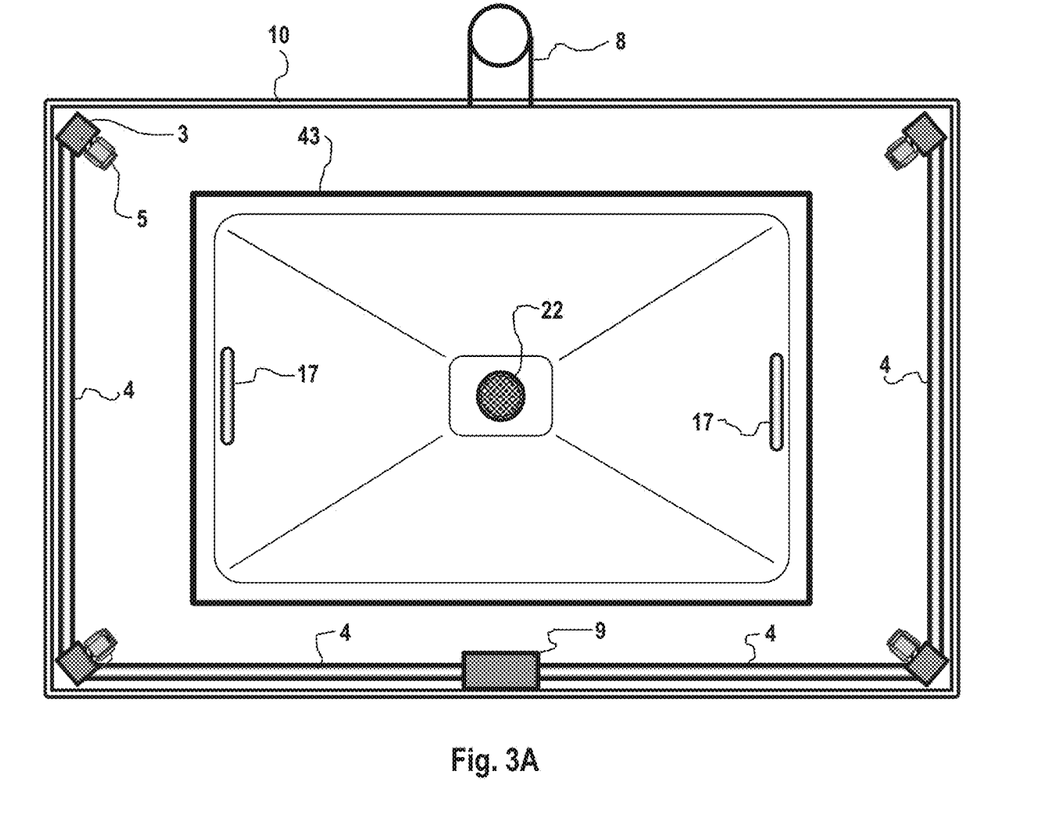
FIG. 3A is a top plan view of the embodiment of FIG. 1, with the tank separator panel installed.

Shown in FIG. 3A is a top view of cleaning tank 10 of the embodiment shown in FIG. 1, with tank lid 1 and screen basket 6 removed. Spray jets 5 are installed on distribution posts 3 and distribution pipes 4 are connected between distribution posts 3 and switching valve 9. Ventilation pipe 8 is attached to the back of cleaning tank 10. The removable tank separator panel 43 is structured be mountable in an area between the bottom portion of the cleaning tank 10 and the upper portion of the recirculating fluid tank 23, such that it creates a partition between the bottom opening 11 of cleaning tank 10 and the top opening 24 of recirculating fluid tank 23. Tank bottom strainer 22 is removably fitted into the opening 42 of tank separator panel 43. One or more handles 17 are installed to tank separator panel 43 for convenience of removing and replacing tank separator panel 43.

Figure 3B:
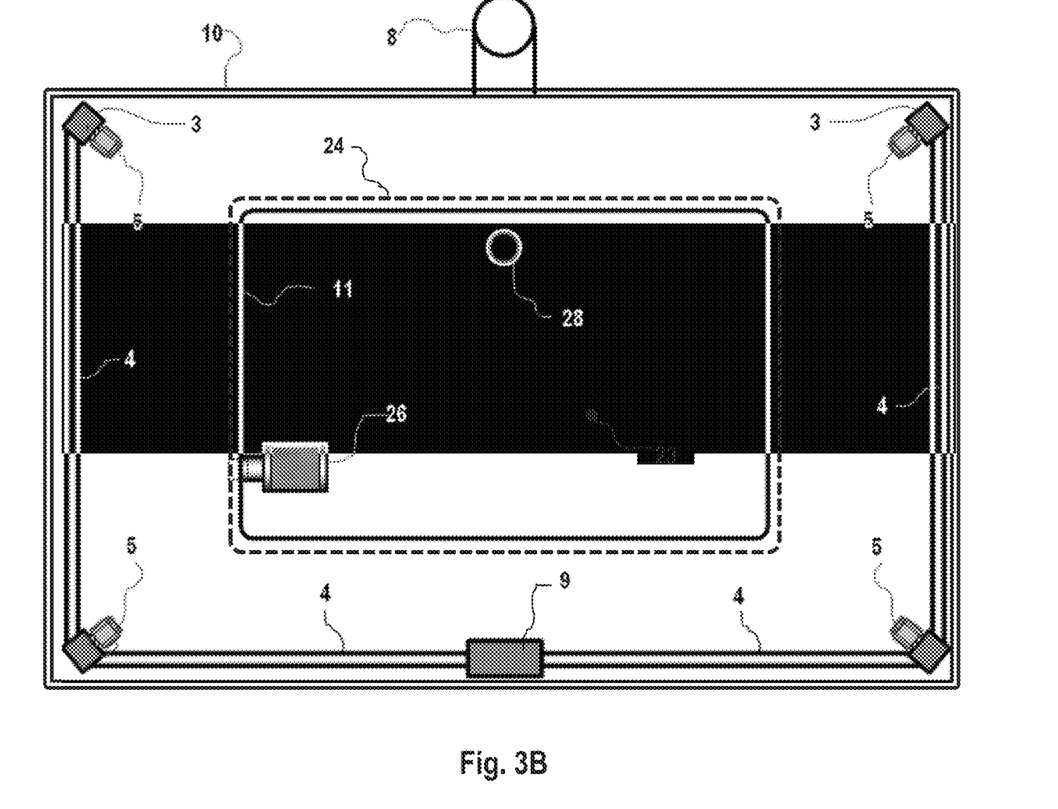
FIG. 3B is a top plan view of the embodiment of FIG. 1, with the tank separator panel removed.

Shown in FIG. 3B is another top view of cleaning tank 10 of the embodiment of FIG. 1, with tank lid 1, screen basket 6, as well as the tank separator panel 43 removed. Through the top opening 24 of cleaning tank 10, the inside of recirculating fluid tank 23 is readily accessible for maintenance and service work including replacement of recirculating fluid filter 26 and extraction of contaminated fluid.

Figure 4A:
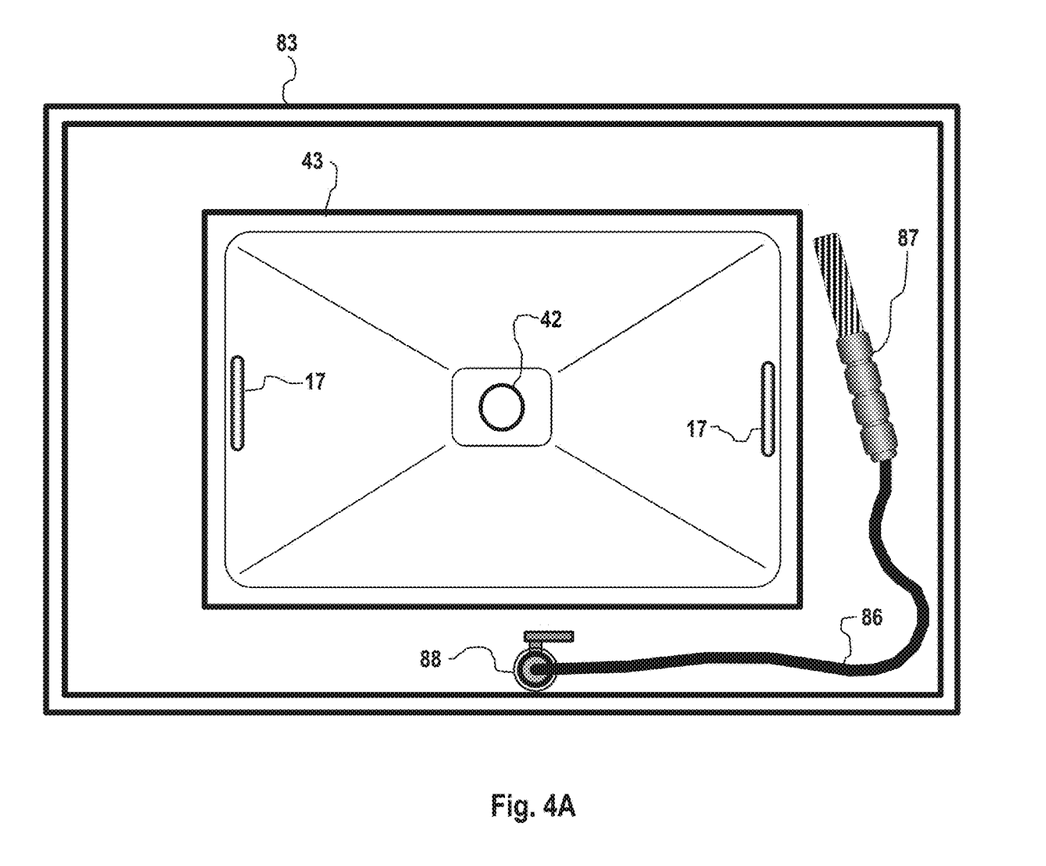
FIG. 4A is a top plan view of the embodiment of FIG. 2, with the tank separator panel installed.

Shown in FIG. 4A is a top view of cleaning tank 83 of the embodiment of FIG. 2, with cleaning tank lid 81 and bottom strainer 22 removed. Tank separator panel 43 is covering the large bottom opening 84 of cleaning tank 83 and also the large top opening 24 (not visible) of the recirculating fluid tank 23. Two handles 17 shown are fixed to the upper surface of tank separator panel 43 for convenient removal and replacement of tank separator panel 43. Not shown in FIG. 4A is an optional removable bottom strainer 22 to be inserted into the drain opening 42 to prevent metal particles, etc. from being introduced into the rest of the system. Fluid supply hose 86 is connected between flow control valve 88 and flow through brush 87.

Figure 4B:
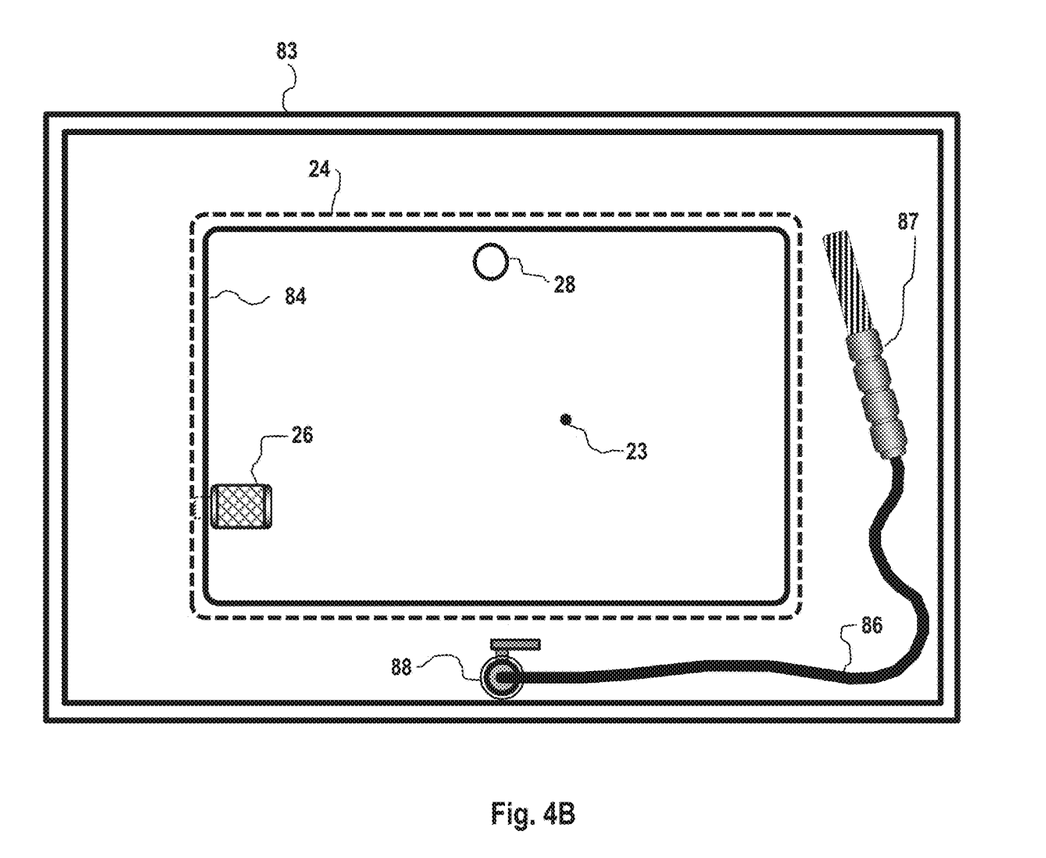
FIG. 4B is a top plan view of the embodiment of FIG. 2, with the tank separator panel removed.

FIG. 4B is a top view of cleaning tank 83 of the embodiment of FIG. 2, with cleaning tank lid 81, lid stay 85 and tank separator panel 43 removed. By removing tank separator panel 43, easy access to the inside of recirculating fluid tank 23 is available for maintenance and service work, eliminating the need to remove cleaning tank 83 and related parts. As discussed above, the tank separator panel 43 receives thereon a variety of objects to be cleaned and therefore is subject to damage such as dents, scratches, etc. during the cleaning operation. Also as discussed above, the removability of tank separator panel 43 offers the possibility of repair or replacement of the damaged tank separator panel 43 and additionally enables selection and thickness of materials and surface finishes such as stainless steel, cold-rolled steel with painted surfaces.

Figure 5A:
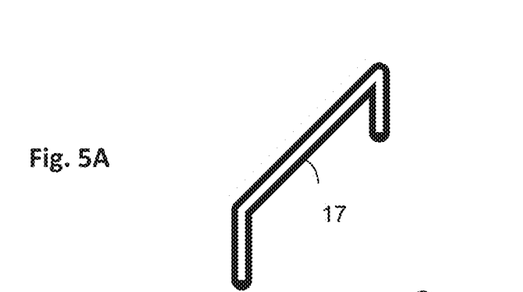
FIG. 5A is a perspective view of a fixed handle for the tank separator panel.
Figure 5B:
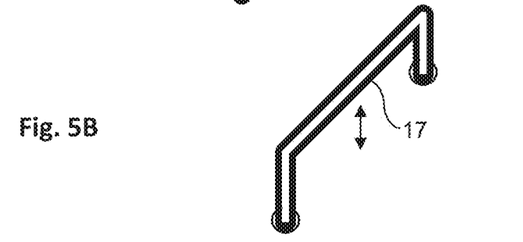
FIG. 5B is a perspective view of a drop down handle for the tank separator panel.
Figure 5C:
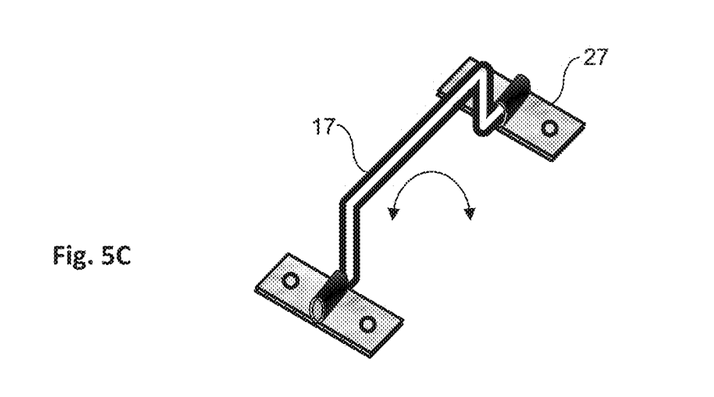
FIG. 5C is a perspective view of a folding handle for the tank separator panel.

Examples of different types of handle 17 for tank separator panel 43 are provided in FIGS. 5A to 5C. 5A is a standard fixed handle, 5B is a drop down type handle, and 5C is a folding type handle with a mounting plate 27. While being more expensive to manufacture, drop down and folding handles have the advantage of being reduced to a lower profile and thus create less interference with the cleaning process which takes place on the surface of tank separator panel 43.

The specific embodiment as shown in FIG. 1 may be operated as follows. An operator opens cleaning tank lid 1, places in the screen basket 6 objects to be automatically cleaned and closes cleaning tank lid 1. Upon pressing the cleaning on/off button 45, switching valve 9 is actuated to pass recirculating fluid 25 only and recirculating fluid pump 19 is turned on so that all spray jets 5 start spraying recirculating fluid 25 against the objects to be cleaned. After the desired pre-set length of time, recirculating fluid pump 19 may be stopped. After few minutes of the desired pre-set dripping time, switching valve 9 may be actuated to pass compressed air only. In this case, air control solenoid valve 15 is opened and the compressed air will first push out contaminated fluid from inside of distribution posts 3 and spray jets 5, and blow contaminated fluid and contaminants away from the objects for a desired pre-set period of time. Then the switching valve 9 is shifted to pass clean fluid 66. Clean fluid pump 30 is activated and clean fluid 66 rinses the objects for a desired pre-set length and repetition. The switching valve 9 may again be actuated to pass compressed air. Air heater 12 may also be turned on and air control solenoid valve 15 may be opened for the desired pre-set period of time so that the heated air blows against the objects for drying. After completion of drying process, the operator may open cleaning tank lid 1 and either remove the objects from screen basket 6 or screen basket 6 with the object remaining inside.

Following the steps above, the cleaning operation is completed and contaminated fluid 25 has flowed into recirculating fluid tank 23 through tank bottom strainer 22 located in tank separator panel 43. The contaminated fluid may be re-used for cleaning until it is contaminated to the extent that the further cleaning operation is not feasible. At this point, drain control solenoid valve 50 may be opened to drain contaminated recirculating fluid 25 from recirculating fluid tank 23 into the distillator system. Switching valve 9 is then closed and filler solenoid valve 13 is opened so that clean fluid pump 30 fills recirculating fluid tank 23 with clean fluid 66 from clean fluid tank 39 through clean fluid suction tube 31, clean fluid supply tube 40 and clean fluid filler tube 7 to be ready for further cleaning operations.

With respect to the specific embodiment as shown in FIG. 2, which includes a manual cleaning apparatus, operator may open cleaning tank lid 1 and place objects to be cleaned on tank separator panel 43. Upon pressing cleaning on/off button 45, recirculating fluid pump 19 is activated and starts dispensing recirculating fluid 25 from flow through brush 87 until the cleaning on/off button 45 is pressed again. Volume of recirculating fluid 25 may be adjusted as desired or completely stopped by adjusting flow control valve 88.

When an operator decides to replace the contaminated recirculating fluid 25 in the recirculating fluid tank 23 with clean fluid 66, the operator may press distillation on/off button 44 which initiates the distillation process. The cleaning on/off button 45 may be momentarily disabled until fluid replacement process has been completed. AC motor 74 which drives vacuum pump 73 and cooling fan 71 is also turned on and starts generating vacuum. Upon the pre-set level of vacuum being detected by vacuum sensor 78, the automatic cleaning function may be temporarily disabled until recirculating fluid tank 23 has been completely replenished with clean fluid 66 and drain control solenoid valve 50 is opened. Contaminated recirculating fluid 25 is then drained from recirculating fluid tank 23 into distillation tank 55 through drain passage pipe 54 which is connected to inlet port 58 of distillation tank 55. Clean fluid pump 30 may then be activated to refill recirculating fluid tank 25 with clean fluid 66 to the desired pre-set level. The function of cleaning on/off button 45 is resumed so that automatic cleaning operation may be started. At this point, immersion heater 50 may be turned on and distillation phase starts. Upon controller 46 detecting the end of the distillation process, immersion heaters 50 may be turned off and the cooling phase begins. When controller 46 detects the desired pre-set temperature to drain contaminant remaining in the bottom of distillation tank 55, distillation tank drain valve 63 opens for the desired pre-set period of time to drain the residue down to contaminant container 79 below. The AC motor 74 driving vacuum pump 73 and cooling fan 71 is turned off and the cooling phase continues until controller 46 detects the desired pre-set temperature to end the cooling phase. At this point, distillation process has been completed and the distillation apparatus is ready for the next distillation operation.

During the distillation process, if water level sensor 68 installed in clean fluid tank 39 detects excessive level of water in clean fluid tank 39, controller 46 may be programmed to give out a warning sign or error message. Furthermore, if fluid level sensor 69 in clean fluid tank 39 detects low levels of clean fluid 66, controller 46 may be programmed to give out another warning sign or error message. When the operator fills clean fluid tank 39 with clean fluid 66 through clean fluid tank filling port 35, an optional clean fluid tank breather port 36 may be used to provide a secondary air outlet for increased filling speed.

In accordance with another embodiment, a cleaning apparatus may be manufactured and used without a distillator, with the cleaning apparatus comprising cleaning tank 10, recirculating fluid tank 23 mounted below the clean tank 10, a removable separator panel 42 partitioning the recirculating fluid tank 39 from the cleaning tank 10, and a fluid dispenser system for dispensing fluid from the recirculating fluid tank 39. If desired, a separate distillator may be used to perform any necessary distillation functions.

Element List

| No. | DESCRIPTION |
|---|---|
| 1 | Cleaning Tank Lid |
| 2 | Cleaning Tank Hinge |
| 3 | Distribution Post |
| 4 | Distribution Pipe |
| 5 | Spray Jet |
| 6 | Screen Basket |
| 7 | Clean Fluid Filler Tube |
| 8 | Ventilation Pipe |
| 9 | Switching Valve |
| 10 | Cleaning Tank |
| 11 | Cleaning Tank Bottom Opening |
| 12 | Air Heater |
| 13 | Filler Solenoid Valve |
| 14 | Re-circulating Fluid Supply Tube |
| 15 | Air Control Solenoid Valve |
| 16 | Air Supply Tube |
| 17 | Tank Separator Handle |
| 18 | Air Inlet Fitting |
| 19 | Recirculating Fluid Pump |
| 20 | Base Cabinet |
| 21 | Recirculating Fluid Suction Tube |

-continued

Element List

| No. | DESCRIPTION |
|---|---|
| 22 | Bottom Strainer |
| 23 | Recirculating Fluid Tank |
| 24 | Recirculating Tank Top Opening |
| 25 | Recirculating Fluid |
| 26 | Recirculating Fluid Filter |
| 27 | Folding Handle Mounting Plate |
| 28 | Recirculating Tank Drain Port |
| 29 | [Not used] |
| 30 | Clean Fluid Pump |
| 31 | Clean Fluid Suction Tube |
| 32 | [Not used] |
| 33 | Radiator |
| 34 | Fan Shroud |
| 35 | Clean Fluid Tank Filling Port |
| 36 | Clean Fluid Tank Breather Port |
| 37 | [Not used] |
| 38 | Vacuum Pump Discharge Line |
| 39 | Clean Fluid Tank |
| 40 | Clean Fluid Supply Tube |
| 41 | [Not used] |
| 42 | Drain Opening, Tank Separator Panel |
| 43 | Tank Separator Panel |
| 44 | Distillation ON/OFF button |
| 45 | Cleaning ON/OFF button |
| 46 | Controller |
| 47 | [Not used] |
| 48 | Relay Board |
| 49 | Power Cord with Plug |
| 50 | Drain Control Solenoid Valve |
| 51 | High Voltage Wiring |
| 52 | Low Voltage Wiring |
| 53 | [Not used] |
| 54 | Drain Passage Pipe |
| 55 | Distillation Tank |
| 56 | Immersion Heater |
| 57 | [Not used] |
| 58 | Inlet Port of Distillation Tank |
| 59 | Vapor Outlet Port of Distillation Tank |
| 60 | Vapor Outlet Pipe |
| 61 | Debris Drain Port of Distillation Tank |
| 62 | [Not used] |
| 63 | Distillation Tank Drain Valve (Auto) |
| 64 | Distillation Tank Drain Valve (Manual) |
| 65 | [Not used] |
| 66 | Clean Fluid |
| 67 | [Not used] |
| 68 | Water Level Sensor |
| 69 | Fluid Level Sensor |
| 70 | Fluid Feed Pipe for Vacuum pump |
| 71 | Cooling Fan |
| 72 | [Not used] |
| 73 | Vacuum Pump |
| 74 | AC Motor |
| 75 | Vacuum Gage |
| 76 | Vacuum Pump Inlet Line |
| 77 | [Not used] |
| 78 | Vacuum Sensor |
| 79 | Contaminant Container |
| 80 | Support Leg |
| 81 | Cleaning Tank Lid |
| 82 | Connection Block |
| 83 | Cleaning Tank |
| 84 | Cleaning Tank Bottom Opening |
| 85 | Lid Stay |
| 86 | Fluid Supply Hose |
| 87 | Flow Through Brush |
| 88 | Flow Control Valve |
| 89 | Cleaning Tank Lid Hinge |
| 90 | Transmission housing (object to be cleaned) |
| 91 | Front stopper projection |
| 92 | Front support projection |
| 93 | Rear support projection |

The invention claimed is:

1. A cleaning and distillation apparatus comprising:
   a clean fluid tank for storing cleaning fluid, the clean fluid tank having:
      a first inlet for receiving cleaning fluid,
      a second inlet for receiving distilled cleaning fluid,
      an outlet for dispensing fluid;
   a cleaning tank for receiving objects to be cleaned, the cleaning tank having a bottom portion comprising a bottom opening which extends over a majority of the bottom portion;
   a recirculating fluid tank mounted below the cleaning tank, the recirculating fluid tank having an upper portion in fluid communication with the bottom portion of the cleaning tank, and an outlet for dispensing contaminated fluid, the upper portion having a top opening located below the bottom opening of the cleaning tank, the top opening adapted to allow for maintenance and service work to be performed on the recirculating fluid tank;
   a removable separator panel resting on the bottom portion of the cleaning tank and having a larger surface area than the bottom opening, the removable separator panel comprising a top, cleaning surface for supporting the objects to be cleaned, and a bottom surface forming at least a substantial part of a top of the recirculating tank such that the separator panel partitions the cleaning tank from the recirculating fluid tank and the separator panel is removable to provide access to the recirculating fluid tank for maintenance and service work, the separator panel having an outlet to release fluid from the cleaning tank into the recirculating fluid tank, and the separator panel being impermeable to the cleaning fluid except at the outlet of the separator panel;
   a handle for removing and replacing the removable separator panel, the handle being positioned on the removable separator panel outside a perimeter of the bottom opening of the cleaning tank;
   a distillator for distilling contaminated fluid, the distillator having:
      a distillation tank having an inlet for receiving contaminated fluid from the outlet of the recirculating fluid tank,
      a heater for heating contaminated fluid into vapor,
      a vapor outlet,
      a first outlet for dispensing contaminants remaining from vaporization,
      a condenser in fluid communication with the vapor outlet for converting vapor into distilled cleaning fluid, and
      a second outlet for dispensing distilled cleaning fluid into the second inlet of the clean fluid tank; and
   a fluid dispenser for dispensing fluid from at least one of the clean fluid tank and recirculating fluid tank.

2. The apparatus according to claim 1, further comprising a compressed air dispenser in fluid communication with the fluid dispenser.

3. The apparatus according to claim 2, further comprising at least one selectively openable valve mounted to any one of the distillator, the clean fluid tank, the recirculating fluid tank, the compressed air dispenser and the fluid dispenser.

4. The apparatus according to claim 3, further comprising a switch in communication with the selectively openable valve for controlling the fluid dispenser to selectively dispense any one of fluid from the recirculating fluid tank, fluid from the clean fluid tank and compressed air.

5. The apparatus according to claim 1, wherein the distillator further comprises a vacuum for generating a suction force.

6. The apparatus according to claim 1, wherein the removable separator panel comprises at least one surface projection adapted to support the objects to be cleaned.

7. The apparatus according to claim 1, further comprising a sensor to monitor vacuum level.

8. The apparatus according to claim 1, further comprising a sensor to monitor temperature within the distillator.

9. The apparatus according to claim 1, further comprising at least one level sensor to monitor level of fluid in the clean fluid tank.

10. The apparatus according to claim 1, wherein the fluid dispenser further comprises a fluid flow-through brush.

11. The apparatus according to claim 10, further comprising a valve for controlling fluid flow to the fluid flow-through brush.

12. The apparatus according to claim 10, further comprising a foot pedal for controlling fluid flow to the fluid flow-through brush.

13. The apparatus according to claim 1, further comprising a container for receiving contaminants from the first outlet of the distillator.

14. The apparatus according to claim 1, wherein the bottom portion of the cleaning tank is integral with the top portion of the recirculating fluid tank.

15. The apparatus according to claim 1, further comprising a pipeline for transporting fluid from the clean fluid tank to the recirculating fluid tank.

16. The apparatus according to claim 1, further comprising a controller for selectively actuating at least one of the distillator and fluid dispenser.

17. The cleaning and distillation apparatus according to claim 1, further comprising a removable strainer mountable to the outlet of the separator panel.

18. A cleaning apparatus comprising
   a clean fluid tank for storing cleaning fluid, the clean fluid tank having:
      a first inlet for receiving cleaning fluid,
      a second inlet for receiving distilled cleaning fluid,
      an outlet for dispensing fluid;
   a cleaning tank for receiving objects to be cleaned, the cleaning tank having a bottom portion comprising a bottom opening which extends over a majority of the bottom portion;
   a recirculating fluid tank mounted below the cleaning tank, the recirculating fluid tank having an upper portion in fluid communication with the bottom portion of the cleaning tank, and an outlet for dispensing contaminated fluid, the upper portion having a top opening located below the bottom opening of the cleaning tank, the top opening adapted to allow for maintenance and service work to be performed on the recirculating fluid tank;
   a removable separator panel resting on the bottom portion of the cleaning tank and having a larger surface area than the bottom opening, the removable separator panel comprising a top, cleaning surface for supporting the objects to be cleaned, and a bottom surface forming at least a substantial part of a top of the recirculating tank such that the separator panel partitions the cleaning tank from the recirculating fluid tank and the separator panel is removable to provide access to the recirculating fluid tank for maintenance and service work, the separator panel having an outlet to release fluid from the cleaning tank into the recirculating fluid tank, and the separator panel being impermeable to the cleaning fluid except at the outlet of the separator panel; and a handle for removing and replacing the removable separator panel, the handle being positioned on the removable separator panel outside a perimeter of the bottom opening of the cleaning tank;

a fluid dispenser for dispensing fluid from the recirculating fluid tank.

19. The cleaning apparatus according to claim 18, further comprising a removable strainer mountable to the outlet of the separator panel.

\* \* \* \* \*